Dec. 19, 1961  F. J. LE VOCI  3,013,439
SPEED REDUCERS
Filed Nov. 14, 1960
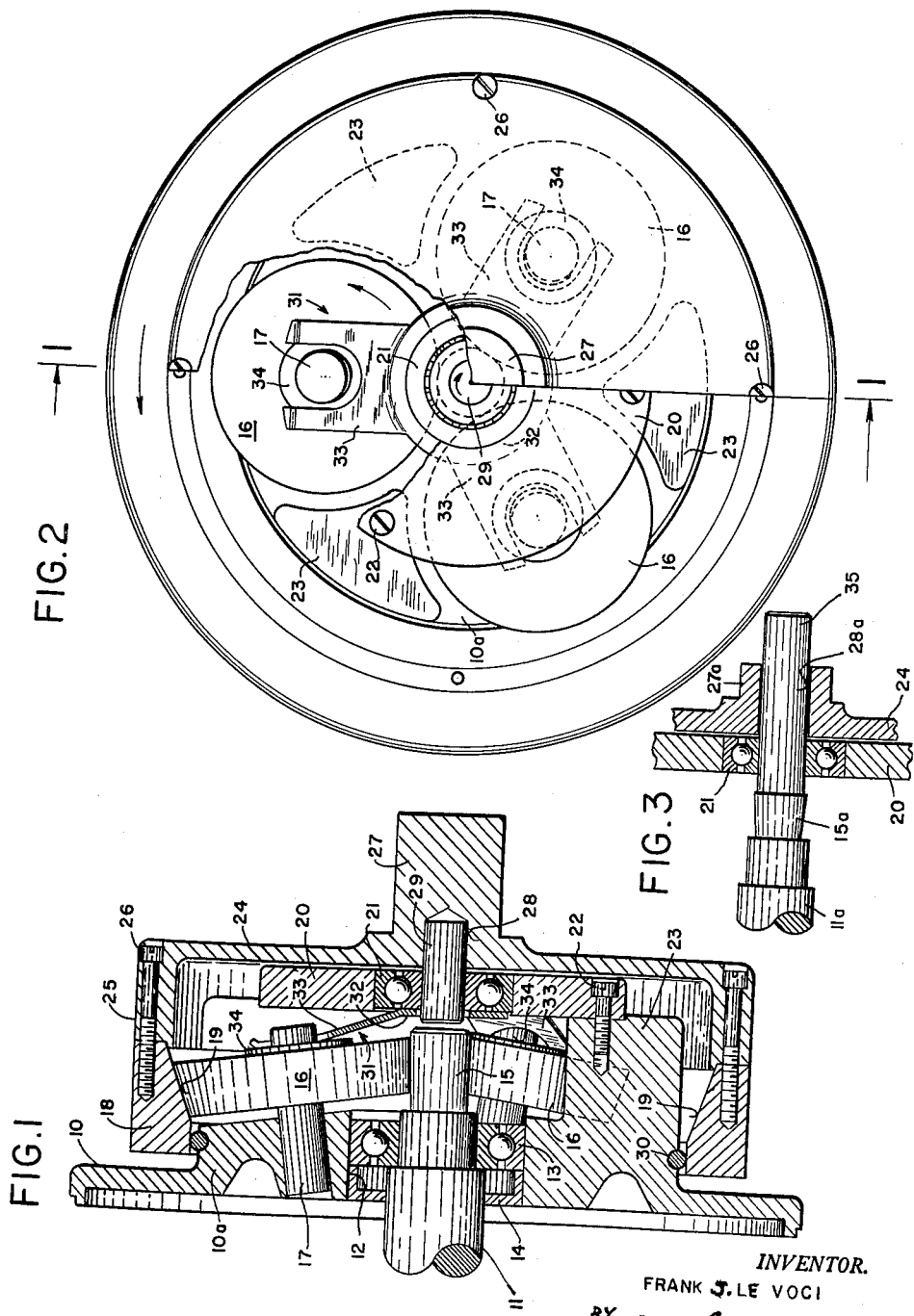
INVENTOR.
FRANK J. LE VOCI
BY
J. Ledermann
ATTORNEY

United States Patent Office 3,013,439
Patented Dec. 19, 1961

3,013,439
SPEED REDUCERS
Frank J. Le Voci, 1053 Pierce Ave., New York, N.Y.
Filed Nov. 14, 1960, Ser. No. 68,812
8 Claims. (Cl. 74—209)

This invention relates broadly to speed reducers and a primary object of the invention is the provision of a new and improved speed reducer, particularly for electric motors but also for other driving means, of the conical planetary type utilizing friction between its rollers to achieve torque transfer from the input shaft to the output shaft, the torque being varied by pressure of a suitably constructed and positioned spring. An overload cut-off switch on the driving motor may be used to deenergize the motor when the maximum allowable torque is exceeded.

Another object of the invention is the provision of a speed reducer of the type mentioned wherein the motor input shaft extends through and beyond the reduced speed output shaft so that two speeds may be available when required.

The above as well as additional objects will be clarified in the following description wherein reference numerals refer to like-numbered parts in the accompanying drawing. It is to be noted that the drawing is intended primarily for the purpose of illustration and that it is therefore neither desired nor intended to limit the invention necessarily to any or all of the exact details shown or described except insofar as they may be deemed essential to the invention.

Referring briefly to the drawing, FIG. 1 is a sectional view taken on the line 1—1 of FIG. 2.

FIG. 2 is a front elevational view of a speed reducer embodying features of the present invention mounted on the end bell of a motor, with parts broken away to expose the interior.

FIG. 3 is a fragmentary sectional view showing a modified construction to obtain two output shafts of varying speeds.

Referring in detail to the drawing, the numeral 10 indicates the end bell of an electric motor, not shown, whose output shaft is shown at 11.

The bell 10 has an axial annular boss 10a and an axial opening 12 holding a bearing 13 through which the shaft 11 extends, a suitable grease shield 14 being provided between the shaft and the wall of the opening 12. A portion of the shaft 11, for example, the portion 15 which is shown to be the end of the shaft in FIG. 1 and which is conical, is in frictional engagement with the conical surfaces of three circumferentially equidistantly mounted conical rollers 16. The rollers 16 are rotatably mounted on axles or pins 17 which are anchored, as by a forced fit, in the bell 10 and which lie at suitable equal angles to the motor shaft 11.

A ring 18, preferably cylindrical on the outside, has a conical inner surface or race 19 complementary to the slope of the conical surfaces of the rollers 16 along the lines of contact between the rollers and the race. A bushing 20, holding a bearing 21, is secured by circumferentially spaced screws 22 against the flat outer surfaces of similarly spaced projecting portions 23 of the boss 10a of the bell 10. A cover plate 24 provided with a flange 25 is secured by the latter through spaced screws 26 to the ring 18.

The cover 24 has an axial cylindrical elongated boss 27 which constitutes the output shaft of the device. An axial passage 28 in the shaft 27 in alignment with the bearing 21 has force fitted therein a stub shaft or pin 29. A grease seal 30 is provided between the ring 18 and the bell 10.

A three-fingered leaf spring 31 consisting of an annular center portion 32 which surrounds the pin 29 and lies flat against the bearing 21 has forked fingers 33 which bear against the rollers 16 through the medium of thrust washers 34.

It is now apparent that as the motor shaft 11 rotates, its conical portion 15 will frictionally turn the rollers 16 which in turn will rotate the ring 18 and hence the output shaft 27. The spring 33 presses against the rollers 16 and yieldably restrains them from movement outward along their shaft pins 17.

In the foregoing description of the drawing, FIGS. 1 and 2, the speed reducer has been set forth as being formed unitarily with the end bell of an electric motor. This need not be so, however, for the member referred to by the numeral 10 as an end bell may constitute the frame or housing, or a portion of the frame or housing, of a separate speed reducer device in which the shaft 11 constitutes the drive shaft and is provided with suitable or standard coupling means, not shown, for coupling it to the drive shaft of an electric motor or any other rotating power unit or engine. Or the shaft 11 may be provided with a gear or gears for the purpose of gearing it to the driving power unit. This applies, of course, to both modifications illustrated in the drawing, that is, the modification shown in FIGS. 1 and 2 and that shown in FIG. 3. In some cases wherein the speed reducer is a unit separate from the motor or other power unit, the speed reducer would be provided with a base on which the member 10 or its equivalent would be held rigid in the form of a frame or as part of a frame. In other such cases the member 10 or an equivalent member may be clamped or otherwise attached to the motor or other rotating driving member with the shaft 11 aligned with and coupled to the shaft of the motor.

Regardless of whether the speed reducer is provided as a part of or attachment to a motor or the like, as illustrated in the drawing, or as a separate unit adapted to be coupled to the shaft of the motor or the like, the structure and operation of the invention is the same in its essential features.

In the modification shown in FIG. 3, parts which are identical to parts above described bear the same reference numeral but parts which are modified with respect to those above described bear the same reference numeral followed by the suffix "a." Herein the motor shaft 11a is elongated beyond the portion 15a and the axial opening 28a in the output shaft or hub 27a extends all the way through the latter. The elongation of the shaft 11a is sufficient to carry its extremity 35 beyond the extremity of the hub 27 so that the projecting portion 35 may itself be used as a drive shaft when a higher output speed is desired. Thus a choice of two speeds is available from the device.

It is obvious that the device as above set forth will take a certain amount of overload without necessarily overloading the motor as a degree of slippage can occur for relatively short periods of time, between the various rolling surfaces. This feature is useful in the application of the device to serve as a window opener or closer, or in other small power applications.

If desired, the rolling surfaces of the device may be provided with a fine straight knurl so that they engage in the manner of finely pitched gears, in case increased traction between the surfaces is advantageous.

While the invention has been described above with particular reference to the accompanying drawing, such is not to be construed as entailing a limitation of the invention which is best defined in the accompanying claims.

The invention having thus been described, what is claimed and desired to be secured by Letters Patent is as follows:

1. In combination with a motor having an end bell provided with a reduced annular boss on the outer side thereof and having the drive end of the motor shaft thereof projecting through and beyond the boss, a housing, said end of the shaft having at least a portion thereof conical and tapering in a direction toward the bell, a plurality of equidistantly circumferentially spaced axles extending outward from said boss at equal acute angles to and divergently with respect to said shaft, said axles having conical rollers tapering in a direction toward the bell rotatably and slidably mounted thereon complementary to and in engagement with said conical portion of the shaft, said housing consisting of a ring and a removable cover, said ring surrounding and being rotatably mounted on said rollers and having an internal race complementary to and frictionally engaging said rollers, said cover being secured to said ring and having a hub coaxial with said shaft providing an output shaft whose speed is reduced with respect to the speed of the motor shaft, and resilient means normally restraining the rollers from movement toward the outer ends of said axles.

2. A combination according to claim 1, said boss having outward extensions extending equidistantly beyond said conical portion of the motor shaft, a bushing secured coaxial with the motor shaft to said projections of the boss and having a bearing therein, said resilient means mounted between said bearing and said rollers.

3. A combination according to claim 1, said boss having outward projections extending equidistantly beyond said conical portion of the motor shaft, said cover including said hub having an axial opening therein, a cylindrical pin registering in said opening and projecting into said housing, a bushing secured to said projections and having a bearing therein coaxial with the motor shaft, said pin extending through said bearing, a spider having an annular center portion surrounding said pin and in contact with said bearing and a number of circumferentially equidistantly spaced spring fingers extending from said center portion having their free ends bearing against the outer faces of said rollers to normally restrain the rollers from movement toward the outer ends of said axles.

4. A combination according to claim 1, said cover including said hub having an axial opening therein extending therethrough, said motor shaft having an extension beyond said conical portion thereof extending through said opening and beyond said hub whereby said extension provides a second output shaft at unreduced motor speed.

5. In combination with a motor having an end bell and having the drive end of the shaft thereof extending beyond the bell, a conical planetary speed reducer consisting of a rotatable cylindrical housing having one end closed and provided with an axial hub serving as an output shaft, said drive end of the motor shaft having at least a portion thereof conical, a plurality of circumferentially spaced conical rollers rotatably supported on the bell in frictional contact with said conical portion, the other end of the housing having an internal conical race surrounding said rollers and complementary therewith in frictional engagement with the rollers, and resilient means normally pressing said rollers into close engagement with said conical portion of the motor shaft.

6. A speed reducer comprising a stationary frame having an axial boss thereon, an axial passage extending through said frame and boss, a drive shaft extending through said passage adapted to be rotated by a rotating power unit, a rotatable housing including a circumferential flange and a removable end wall secured to one end of the flange, a plurality of equidistantly circumferentially spaced stub shafts secured to said boss and extending therefrom at equal acute angles to said drive shaft, said housing being mounted on said boss with said end wall remote from the boss and with a portion of said flange remote from said end wall rotatably mounted on the boss, said stub shafts having conical rollers rotatably mounted thereon, a portion of said flange between said first-named portion and said end wall having a complementary conical raceway thereon in operative contact with said rollers, a portion of said drive shaft positioned between said boss and said end wall having a conical conformation complementary to said rollers and having said rollers in operative contact therewith, said end wall having an axial output shaft rigid with the other side thereof, and resilient means normally urging said rollers into operative contact with said raceway and said conical portion of the drive shaft.

7. A speed reducer according to claim 6, said end wall and said output shaft having an axial passage therethrough, said drive shaft having an axial extension thereon extending through and beyond the axial passage in said end wall and said output shaft.

8. A speed reducer according to claim 6, said end wall having an axial pin anchored therein and projecting toward said drive shaft, a bushing secured to said boss adjacent said end wall and having a bearing therein surrounding said pin and through which the pin projects, said resilient means comprising a spider having an annular portion surrounding said pin and in contact with said bearing, said annular portion of the spider having a number of equidistant spring fingers extending therefrom and bearing against the outer faces of said rollers to normally restrain the rollers from movement toward the outer ends of said axles.

References Cited in the file of this patent

UNITED STATES PATENTS

| 398,628 | Laforge et al. | Feb. 26, 1889 |
| 1,212,462 | Donnelly | Jan. 16, 1917 |

FOREIGN PATENTS

| 443,700 | Germany | Jan. 25, 1928 |
| 879,793 | Germany | June 15, 1953 |